United States Patent
Vadhri Venkata et al.

(10) Patent No.: US 10,964,069 B2
(45) Date of Patent: Mar. 30, 2021

(54) METHOD AND GRAPHIC PROCESSOR FOR MANAGING COLORS OF A USER INTERFACE

(71) Applicant: NAGRAVISION S.A., Cheseaux-sur-Lausanne (CH)

(72) Inventors: Ratnam Vadhri Venkata, Bangalore (IN); Gaurav Sahi, Bangalore (IN); Chawandi Prabhu, Bangalore (IN); Antoine Burckard, Montigny le Bretonneux (FR)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

(21) Appl. No.: 15/535,337

(22) PCT Filed: Dec. 11, 2015

(86) PCT No.: PCT/EP2015/079369
§ 371 (c)(1),
(2) Date: Jun. 12, 2017

(87) PCT Pub. No.: WO2016/092059
PCT Pub. Date: Jun. 16, 2016

(65) Prior Publication Data
US 2017/0365072 A1     Dec. 21, 2017

(30) Foreign Application Priority Data
Dec. 12, 2014 (EP) .................... 14197598

(51) Int. Cl.
| | |
|---|---|
| *G06T 11/00* | (2006.01) |
| *G06F 3/048* | (2013.01) |
| *G09G 5/02* | (2006.01) |
| *G06T 7/90* | (2017.01) |
| *G06T 11/60* | (2006.01) |

(Continued)

(52) U.S. Cl.
CPC ............ *G06T 11/001* (2013.01); *G06F 3/048* (2013.01); *G06F 8/38* (2013.01); *G06F 9/451* (2018.02);
(Continued)

(58) Field of Classification Search
None
See application file for complete search history.

(56) References Cited

U.S. PATENT DOCUMENTS

| | | | |
|---|---|---|---|
| 6,317,128 B1 | 11/2001 | Harrison et al. | |
| 6,486,894 B1 * | 11/2002 | Abdelhadi | G06F 3/04812 345/161 |

(Continued)

FOREIGN PATENT DOCUMENTS

EP     0856829     1/1998

OTHER PUBLICATIONS

International Search Report issued in PCT/EP2015/079369 dated Mar. 8, 2016.

(Continued)

*Primary Examiner* — Aaron M Richer
(74) *Attorney, Agent, or Firm* — Polsinelli LLP

(57) ABSTRACT

An automated method and a graphic processor for managing colors for a user interface to be displayed over at least one multimedia frame provided by an electronic device. The user interface comprises at least one graphical item having at least one predetermined color. The method comprises steps of: analyzing, by a graphic processor of the electronic device, the digital multimedia content comprising the at least one multimedia frame, extracting, from said digital multimedia content, data blocks defining an array of dominant colors in at least a part of the at least one multimedia frame, filtering the array of dominant colors of the part of at least one multimedia frame according to at least one pre- (Continued)

defined criterion managing color selection, obtaining a resulting array of dominant colors, generating, by a user interface generator coupled to the graphic processor, at least one graphical item by applying at least one dominant color from the resulting array of dominant colors to said at least one graphical item, said at least one dominant color being selected to be visible in the part of the at least one multimedia frame whereon the at least one graphical item is displayed.

18 Claims, 3 Drawing Sheets

(51) Int. Cl.
    *G06F 9/451*     (2018.01)
    *G06F 8/38*     (2018.01)

(52) U.S. Cl.
    CPC ............... *G06T 7/90* (2017.01); *G06T 11/60* (2013.01); *G09G 5/02* (2013.01); *G06T 2200/24* (2013.01); *G06T 2207/10016* (2013.01); *G06T 2207/10024* (2013.01); *G09G 2340/14* (2013.01); *G09G 2360/16* (2013.01)

(56) References Cited

U.S. PATENT DOCUMENTS

| | | | |
|---|---|---|---|
| 8,675,019 B1* | 3/2014 | Feinstein | G09G 5/026 345/589 |
| 8,872,969 B1 | 10/2014 | Rathi et al. | |
| 2002/0000995 A1 | 1/2002 | Sawada et al. | |
| 2002/0018594 A1* | 2/2002 | Xu | G06K 9/00711 382/190 |
| 2003/0001856 A1 | 1/2003 | Sawada et al. | |
| 2003/0063130 A1* | 4/2003 | Barbieri | G11B 27/105 715/833 |
| 2007/0252804 A1 | 11/2007 | Engel et al. | |
| 2008/0292273 A1* | 11/2008 | Wang | H04N 5/76 386/249 |
| 2010/0208276 A1* | 8/2010 | Murakami | H04N 1/41 358/1.2 |
| 2011/0319160 A1* | 12/2011 | Arn | G10H 1/368 463/30 |
| 2012/0154420 A1* | 6/2012 | Calandrino | G09G 5/02 345/589 |
| 2013/0104061 A1 | 4/2013 | Engel et al. | |
| 2014/0037200 A1* | 2/2014 | Phillips | G06T 7/90 382/162 |
| 2016/0049109 A1 | 2/2016 | Engel et al. | |
| 2016/0232696 A1* | 8/2016 | Voss | H04N 21/4312 |
| 2017/0336865 A1* | 11/2017 | Meyer | G06F 3/013 |

OTHER PUBLICATIONS

Written Opinion issued in PCT/EP2015/079369 dated Mar. 8, 2016.
Wei Hong, et al., "Smart Compositing: a Real-Time Content-Adaptive Blending Method for Remote Visual Collaboration", IEEE, pp. 2317-2320, (Mar. 2012).

\* cited by examiner

METHOD AND GRAPHIC PROCESSOR FOR MANAGING COLORS OF A USER INTERFACE

CROSS REFERENCE TO RELATED APPLICATIONS

This application is a U.S. National Stage Application of International Application No. PCT/EP2015/079369 filed Dec. 11, 2015, which claims priority from European Patent Application No. 14197598.7 filed Dec. 12, 2014.

FIELD OF THE INVENTION

The present invention relates to an automated method and a graphic processor for managing and updating colors of a user interface comprising graphical elements, text, and images to be displayed over a background formed by a still image, a moving image, or video content.

TECHNICAL BACKGROUND

A user-friendly graphical user interface provides attractive graphical effects having a pleasant esthetic appearance as well as a possibility of an easy and intuitive usage. A user interface generally displays items comprising text strings, graphical icons, graphical objects, gradients and images. A common way to display the list of items is to configure a first graphics layer of the graphical user interface as a static background and a second graphics layer to display the items over the background in a scrolling manner. The background may have a predetermined area, which is distinguished from the surrounding area by a special effect, such as a highlight, a gradient or a frame. The item which is displayed over the predetermined area is treated as an item of interest. Such a display does not alter the way in which the items are displayed on the second graphics layer. Another way to display the list of items is to configure a first graphics layer of the graphical user interface to display the items and a second graphics layer to display a symbol or a frame in a scrolling manner over the first layer. The item over which the symbol is displayed is treated as the item of interest. Such display does not alter the way in which the items are displayed on the first graphics layer.

With the development of technology in the field of electronic devices such as computers, mobile equipments, television sets associated to set top boxes, etc., various types of user interfaces have been developed to facilitate users' experiences in using the devices. Today, many electronic devices are implemented with a touch screen to provide a graphic user interface UI replacing keyboards. The UI thus includes various types of menus and images, as for example, windows, scroll bars, icons, control buttons, etc.

In video centric devices and video display environments, the amount of content is considerably increased and the type of content is diversified as compared to an analog broadcast environment of the related art. The User Interfaces (UIs) are mostly two-dimensionally configured in an On Screen Display (OSD) manner. However, there is a limitation in the two-dimensional configuration of the UIs. Since information is displayed in a planar fashion, a user feels inconvenience in recognition and use of a UI. For example, if a UI including much information or a UI including a main menu and a sub menu displayed in a planar fashion is provided, the menu may be superimposed on a background image or frames of video content displayed on a main screen of a television set for example, in such a way that all or part of the UI may be either visible or hidden or become unreadable. Therefore, there is a need for a method and a system able to manage and update colors used in the user interface in a smart way, which is automated and easier for the user.

Regarding video display environments, document U.S. Pat. No. 8,872,969 discloses a method of dynamic relative adjustment of a color parameter of at least a portion of a video frame and/or a color parameter of at least a portion of a subtitle associated therewith before being displayed. The method comprises steps of storing data related to a video frame separately from data related to a subtitle of the video frame in a memory of a data processing device, and comparing, through a processor communicatively coupled to the memory, a color parameter of the data related to the video frame to a color parameter of the data related to the subtitle. The method also includes dynamically adjusting a color parameter of at least a portion of the data related to the subtitle and/or a color parameter of at least a portion of the data related to the video frame based on the comparison. Further, the method includes overlaying the data related to the subtitle on the data related to the video frame following the dynamic adjustment prior to rendering thereof on a display unit.

SUMMARY OF THE INVENTION

An embodiment of the disclosure proposes an automated method for managing colors for a user interface to be displayed over at least one multimedia frame provided by an electronic device according to claim 1.

A further object of the disclosure relates to a graphic processor configured to automatically manage colors in a user interface displayed over at least one multimedia frame provided by an electronic device according to claim 7.

A multimedia frame is defined in the context of the disclosure as any still or moving human eyes visible image provided by a multimedia content.

The method and the graphic processor of the present invention concern dynamic user interfaces displayed on video centric consumer electronic devices. A user interface includes a set of graphical items having various colors, shapes, sizes, and locations on a display screen. Users will be able to select objects or functions from a single or a set of graphical items according to hardware and software configuration of the electronic device. As for a video centric device, an aim consists of showing video content on a display at any time without modifying the size of the multimedia frame or cropping some part of it. To achieve such an aim, using translucent user interfaces may be a preferred option. At the same time, this translucence will result in the color of the user interface to conflict with the background multimedia frame colors and provides distracting user experience.

It has to be noted that the term multimedia content or multimedia frame also includes the case where a real scene produces, by means of a camera, a multimedia frame over which user interface graphical items may be displayed. For example scenes seen by smart glasses or windscreens may be used as background for user interface items in form of text and/or graphics to be exploited by a user.

BRIEF DESCRIPTION OF THE DRAWINGS

The invention will be better understood thanks to the following detailed description, which refers to the attached drawings given as non-limitative examples.

DETAILED DESCRIPTION OF THE INVENTION

Figure 1:
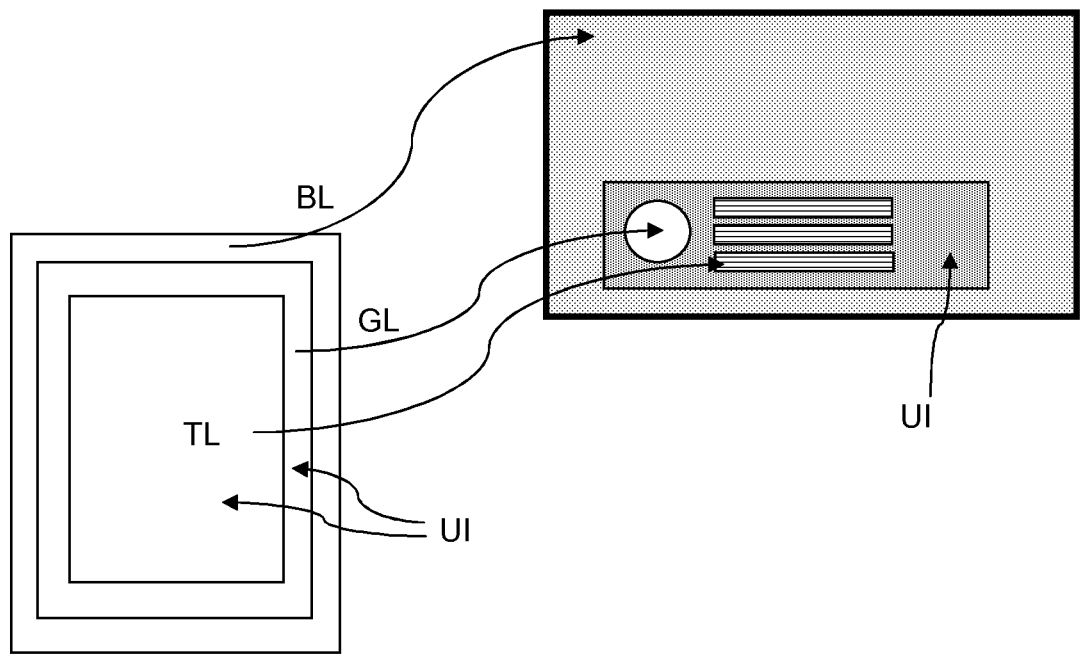
FIG. 1 shows a layered structure of a video multimedia frame comprising a background image layer on which a user interface including a graphic layer and a text layer is superimposed.

In general, images displayed on a screen of a video centric device are rendered in form of several superimposed layers. Each layer contains information provided by different sources in the video device. FIG. 1 illustrates an example of a layered multimedia frame provided by a multimedia content source where the bottom most layer or background layer BL occupies the entire surface of the screen while further layers of a user interface UI may be placed at predefined positions on the screen without necessarily covering the entire surface of the screen. The user interface UI may comprise a graphic layer GL including graphical items such as drawings, animated elements, logos, image boxes, buttons, etc. and a text layer TL including text, alphanumeric characters, ideograms, symbols, frames of various shapes, etc.

The color components of the user interface layers are set by applications rendering these layers and their graphical items on the display. The applications generate, for example, graphical items in form of stacked windows disposed on layers in a predefined order. The colors of the background image in the first layer are preset while the colors of the user interface windows are set by the applications. In a conventional user interface, the colors of the windows are defined in a static way so that in case of overlapping, some windows or items thereof may be hidden or displayed with an insufficient contrast over colors of an under laying window.

Figure 2:
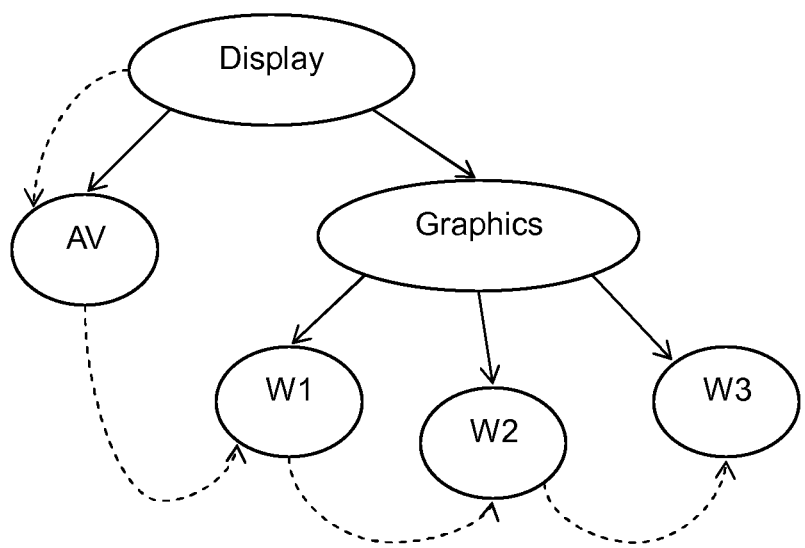
FIG. 2 shows a diagram of the organization of user interface items colors on a video image.

The diagram of FIG. 2 illustrates an example of a display having background colors AV on which user interface graphics are displayed in form of windows W1, W2 and W3 having each a particular set of colors. The display order AV, W1, W2, W3 corresponds to the layers stack where the background image AV is placed on the bottom layer and the windows W3 on the top layer.

A digital multimedia content processed for example by a graphic processor of an interactive multimedia content rendering device or by a multimedia decoder includes digital video data blocks in a compressed form defining the images composition. One known technique for video compression is referred to as the Motion Picture Experts Group (MPEG) compression algorithm. In this algorithm, each frame of a motion picture video is described either independently or as a change from a previously displayed frame. Thus a video scene might be described by a single independent frame which shows the entire scene as it initially appears, followed by a long series of change frames which describe the changes in the scene as actors move, for example. Using such a technique, video data throughput in a transmission channel is considerably increased by eliminating redundant transmission of constant elements of the scene.

The MPEG algorithm is capable of describing an image by either a single independent video frame, called an I-frame, or by a combination of an initial I-frame and one or more succeeding change frames, comprising P-frames describing a change to a previously displayed image and B-frames describing differences between a current frame and both the preceding and following frames to specify its content. Typically, the P-frame data is written into a frame buffer of the graphic processor whose contents are already being displayed, resulting in a modification to the displayed image.

Figure 3:
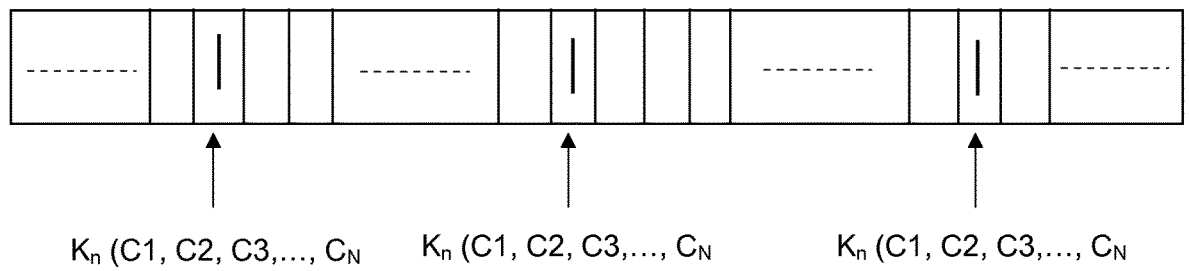
FIG. 3 shows video data blocks of a background image from which dominant color arrays are extracted after analysis and used for user interface items generation.

The color composition information of the background image which may be still or moving is mainly contained in the I-frames data blocks which are analyzed by the graphic processor according to the method of the present invention. This analysis results by an extraction of data blocks defining an array or set of dominant colors of the background image $K_n = (C1, C2, C3, \ldots, C_n)$ where C1 is the least dominant color and $C_n$ the most dominant color, as shown by FIG. 3.

According to further embodiments, the multimedia content received and processed by the graphic processor may comprise video data blocks encoded by using other algorithms than MPEG, as for example Google VP8, VP9, RealVideo, Microsoft ASF, etc. Images provided by cameras associated to glasses or windscreens are generally not compressed so that each frame may be analyzed for getting dominant color arrays. Analog video content may be converted into digital video data blocks that are processed to extract dominant color information.

A dominant color is defined by its higher intensity or strength in relation to other colors in a spectrum. Dominant color strength values may be assigned using a mathematical intensity distribution curve formula.

The graphic processor receives one or more graphical items provided by a user interface generator driven by a specific application to be displayed over a part or the entire background multimedia frame provided by the multimedia content.

The dominant colors of the user interface graphical items may be modified in function of the array of dominant colors of at least a part of the background image $Kn = (C1, C2, C3, \ldots, C_n)$ in a way to be visible in relation to the colors of the concerned part of the background image. One or more colors of the array may thus be changed dynamically, i.e. each time the dominant colors of the background image part change.

The array of dominant colors of the background image may be filtered according to one or more color selection criteria such as quality of the background image, user preferences, genre of the multimedia content, available dominant colors in the array of the I-frame, etc. The quality of a background image may be defined by the resolution, such as the number of pixels per inch, compression rate, sharpness, motion regularity, etc.

In particular, the user interface generator may provide default colors for some graphical items and other graphical items for which the color may be replaced dynamically in function of the dominant color array of the background multimedia frame.

According to an option, the color change may be carried out by a color fader configured to change color within a predefined time period in order to prevent sudden color switching. The color changes are thus softened by introducing a progressive transition through less dominant colors.

In case of rapidly changing dominant colors of background multimedia frames provided by a multimedia content source, the user interface items colors may be filtered in function of the multimedia content genre. An action movie such as a thriller may enable the graphic processor to replace default colors of user interface items by vibrant colors i.e. the most dominant colors of the array. User interface items colors over a movie related to a story for children for example may be changed into soft light colors.

User preferences may also be used for filtering background multimedia frames colors, as for example the color set may be limited to particular colors selected in an interactive manner by the user on the fly, when graphical items of the user interface appear or preferred colors may be based on pre-stored settings.

A frequency of color changes in a time interval may also be applied on user interface items depending on the color of the background layers.

Color changes thus occur dynamically after analysis of the background multimedia frame leading to provide a set of colors to be selected for graphical items in order to present a visible user interface having a pleasant esthetic. The graphical items color is thus adapted to the background multimedia frame so that the color may change when the background multimedia frame changes as well as when the user interface layers move across the background multimedia frame which may display parts with different dominant colors.

For example, a yellow graphical item such as a line passing over a blue background part will change into cyan when it passes over a red background part. According to a further example, a graphical item such as a rectangle may have a different color for each side depending on the dominant color of the background multimedia frame part over which the concerned side is displayed. A subtitle on a background video frame may have different colors on each character depending on the parts of the background video frame the subtitle characters are displayed. A character displayed over a white and a black background part will appear as black on the white background part and white on the black background part. In these conditions, the subtitle remains always visible whatever the color of the background video frame.

According to a further embodiment, a graphical item such as a line, for example, may have an "average" color adapted to be visible on all of the different parts traversed by the line on the display screen. In this example the color array resulting from the analysis and filtering enables selecting the appropriate visible color for modifying color of a user interface graphical item according to the dominant color of the background multimedia frame.

No color change occurs when the user interface item has already a color adapted to background dominant color and when no additional filtering criteria have been previously applied to the background multimedia frame dominant color array.

Figure 4:
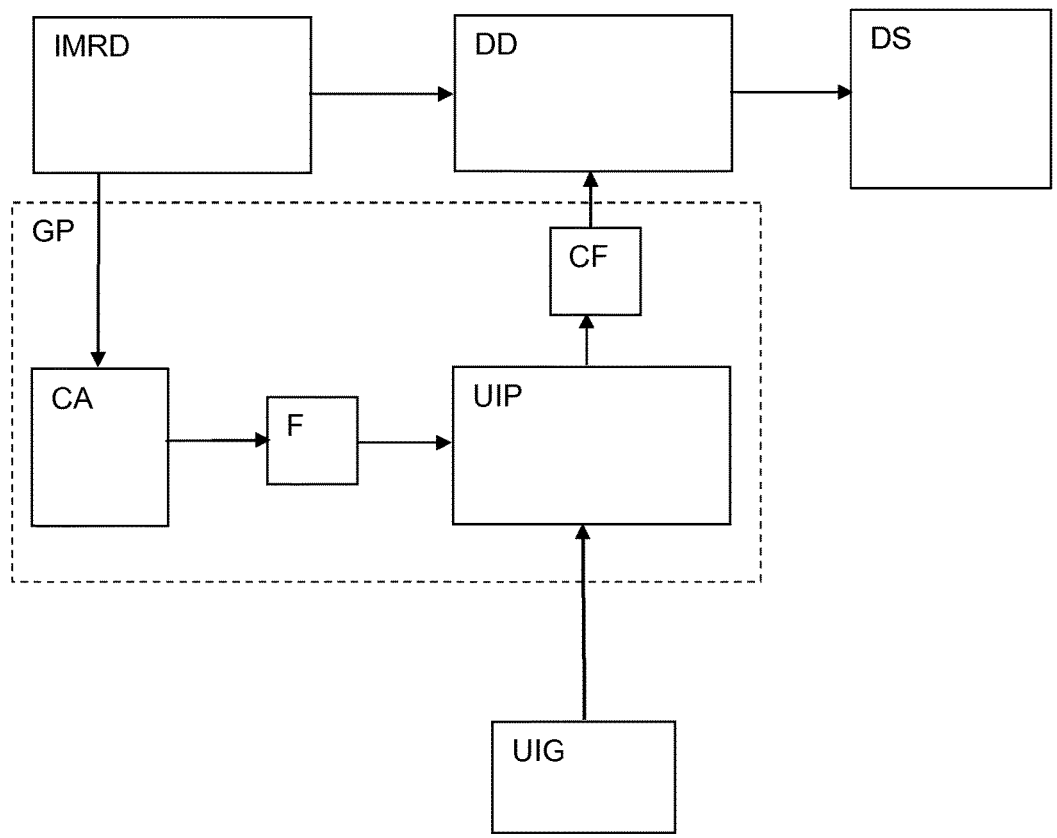
FIG. 4 shows a block diagram of the graphic processor with peripherals configured to manage colors in a user interface displayed over an image provided by an electronic device.

An exemplary graphic processor GP according to the invention is shown by FIG. 4. The graphic processor GP driven by video processing software may preferably be implemented in a video centric electronic device. The video centric device may be for example a video gateway device such as a set top box, a media player, a game player, a television set or the like in a user's home.

The graphic processor GP may be coupled to peripherals such as an interactive multimedia content rendering device IMRD providing, for example, I-frame, B-frame and P-frame video data blocks, a display driver DD coupled to a television set display screen DS and a user interface generator UIG.

The interactive multimedia content rendering device IMRD forwards multimedia content data from the at least one multimedia frame to a content analyzer CA configured to analyze the digital multimedia content data comprising I-frames for example. Dominant color arrays corresponding to at least a part of the at least one multimedia frame displayed on the screen of the television set DS are then extracted from the I-frames and forwarded to a filter F coupled to an output of the content analyzer CA. The filter F is configured to filter the extracted array of dominant colors of the part of at least one multimedia frame according to at least one predefined criterion managing color selection, and to obtain a resulting array of dominant colors.

The graphic processor GP further comprises a dynamic user interface data processor UIP coupled to an output of the filter F and to an output of the user interface generator UIG, which generates user interface graphical items. A dynamic user interface data processor UIP assembles the graphical items to form a user interface UI overlaying the at least one multimedia frame.

The dominant color of the graphical items are selected based on the resulting array of dominant colors obtained at the output of the filter F in such a way to be visible in the part of the at least one multimedia frame whereon the graphical items are displayed.

The user interface generator UIG may be driven by applications running in the video centric device allowing interaction with a user. The user interface UI comprising the assembled graphical items is preferably displayed over the multimedia content thanks to the display driver DD. The graphical items of the user interface UI have therefore dominant colors which may be modified in function of the colors in a part or the entire displayed multimedia frame.

The user interface generator UIG selects one or more colors from the dominant colors array for user interface graphical items according to at least one of above mentioned filtering criterion managing graphical items color selection in the dominant colors array provided by the dominant color analyzer CA.

The user interface UI having adapted colors is forwarded by the dynamic user interface video data processor UIP to the display driver DD for being displayed on the display screen DS over the multimedia frame.

According to an option, the graphic processor GP further comprises a color fader CF inserted between an output of the dynamic user interface data processor UIP and an input of the display driver DD. This color fader CF is configured to change color of graphical items composing the user interface within a predefined time period by introducing a progressive transition through less dominant colors.

Figure 5:
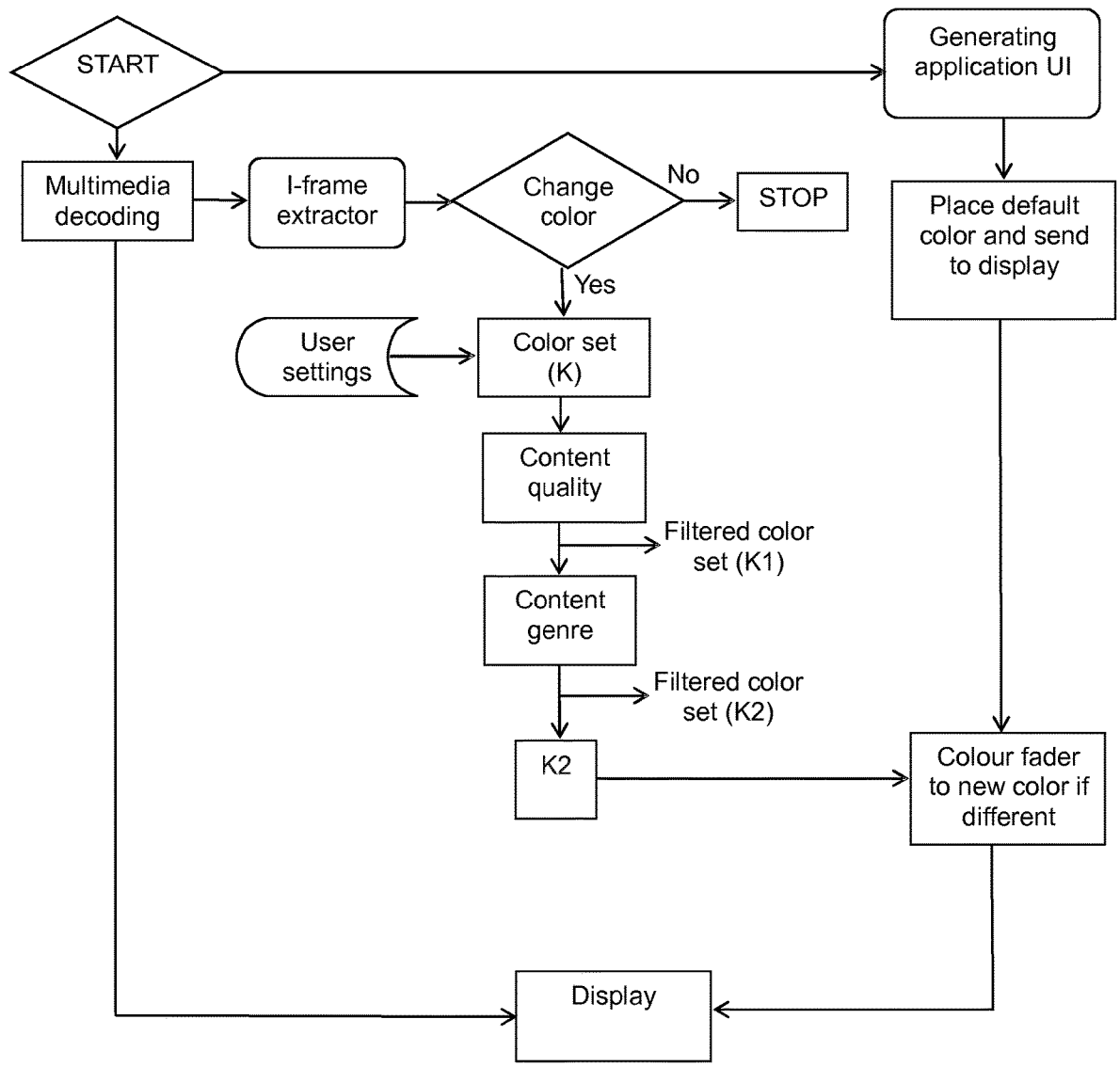
FIG. 5 shows a flow chart of an embodiment of the method according to the invention using criteria managing color selection in arrays of dominant colors of the user interface items and the dominant colors of an image.

The flow chart of FIG. 5 illustrates an embodiment of the method according to the invention using criteria managing user interface items color selection based on multimedia content quality and multimedia content genre. User preferences are also taken into account for the user interface graphical items color selection.

After decoding and analysis of the multimedia content provided by the interactive multimedia content rendering device, I-frames related to dominant colors array are extracted and used as reference to user interface graphical items color changes. An extracted color array K may be filtered by user settings, as for example, pre-stored user preferences, by parameters related to the multimedia content quality to obtain a filtered color array K1 which may be further filtered according to the multimedia content genre to obtain color array K2.

In the example of FIG. 5, color selection is performed by filters applied to the extracted dominant color arrays according to predefined criteria: content quality, content genre, content images dominant colors, etc. For example, in case of a content related to sports, the filter eliminates the least dominant colors to keep the most dominant colors used to enable replacements of the user interface graphical items colors.

In the example, the color set K2 is then used to change, if necessary, colors of the graphical items in the generated application user interface. The color change of user interface graphical items may be performed through the color fader CF coupled to the display driver DD to prevent sudden color switching which may disturb user experience. If no color change is required the generated application user interface is directly displayed on the display screen over the images of the video content.

In case of background visual content provided by real scenes as for example, through smart glasses or windscreens, no I-frame are produced contrarily to the case where a video content is received by a multimedia content rendering device connected to a video data source such as a video streaming server, an optical or hard disc, etc.

However, a camera pointed on a real scene may provide the background multimedia frame which can be analyzed to extract information on dominant colors arrays from color composition. The colors of the user interface graphical items appearing over the real scene may thus change continuously in function of the background multimedia frames dominant colors which also change permanently.

The invention claimed is:

1. An automated method for managing colors of a user interface, the method comprising:
   determining, using a graphic processor, a first dominant color in a first data block of a background multimedia frame of digital multimedia content;
   determining, using at least one criteria, a first color that contrasts the first dominant color, the at least one criteria including selecting a contrasting color for at least one graphical item of a user interface based on a genre of the digital multimedia content;
   applying, by a user interface generator, the first color to a first graphical item of the user interface, the first graphical item being displayed in relation to at least a first portion of the background multimedia frame corresponding to the first data block;
   determining, using the graphic processor, a second dominant color in a second data block of the background multimedia frame of the digital multimedia content, the second dominant color being different than the first dominant color, and the first data block and the second data block corresponding to different portions of the background multimedia frame;
   determining, using the at least one criteria, a second color that contrasts the second dominant color; and
   applying, by the user interface generator, the second color to a second graphical item of the user interface, the second graphical item being displayed in relation to at least a second portion of the background multimedia frame corresponding to the second data block, at least the second portion being different than at least the first portion, and the first and second colors being selected to enable the first graphical item and the second graphical item to be visible in the user interface when displayed in relation to the background multimedia frame.

2. The method according to claim 1, further comprising assembling, by the graphic processor, a set of graphical items to form the user interface the first and second colors being selected to be visible in parts of the digital multimedia content covered by the set of graphical items.

3. The method according to claim 1, further comprising:
   analyzing, by the graphic processor, the digital multimedia content provided by a video transport stream comprising I-frame data blocks; and
   extracting, from the I-frame data blocks, information associated with the first and second dominant colors in the background multimedia frame.

4. The method according to claim 1, wherein the digital multimedia content is provided by a camera implemented in smart glasses or a windscreen, and wherein information associated with the first and second dominant colors is extracted from color composition.

5. The method according to claim 1, further comprising determining the first color according to user preferences introduced in an interactive manner when graphical items of the user interface are displayed based on pre-stored settings.

6. The method according to claim 1, further comprising determining the first color according to a quality of the digital multimedia content represented by the background multimedia frame.

7. A system comprising:
   memory storing executable instructions; and
   a graphic processor controlled by the executable instructions that when executed by the graphic processor further cause the graphic processor to:
      determine a first dominant color in a first data block of a background multimedia frame of digital multimedia content;
      determine, using at least one criteria, a first color that contrasts the first dominant color, the at least one criteria including selecting a contrasting color for at least one graphical item of a user interface based on a genre of the digital multimedia content;
      determine, using the graphic processor, a second dominant color in a second data block of the background multimedia frame of the digital multimedia content, the second dominant color being different than the first dominant color, and the first data block and the second data block corresponding to different portions of the background multimedia frame;
      determine, using the at least one criteria, a second color that contrasts the second dominant color; and
      assemble a set of graphical items received from a user interface generator, the set of graphical items forming the user interface being displayed in relation to at least a portion of the digital multimedia content, the set of graphical items including a first graphical item and a second graphical item, the first color being applied to the first graphical item, and the second color being applied to the second graphical item, the first and second colors being selected so as to be visible in a part of the digital multimedia content where the first and second graphical items are displayed.

8. The system according to claim 7, wherein the digital multimedia content is provided by a video transport stream comprising I-frame data blocks, and wherein the graphic processor is further configured to extract, from the I-frame data blocks, information associated with the first and second dominant colors in the background multimedia frame.

9. The system according to claim 7, wherein the digital multimedia content is provided by a camera implemented in smart glasses or a windscreen, and wherein the graphic processor is further configured to extract, from color composition, information associated with the first and second dominant colors.

10. The system according to claim 7, wherein the first color is determined according to user preferences introduced in an interactive manner when graphical items of the user interface are displayed based on pre-stored settings.

11. The system according to claim 7, wherein the first color is determined according to a quality of the digital multimedia content represented by the background multimedia frame.

12. The system according to claim 7, wherein the graphic processor is further configured by the executable instructions to change color of graphical items within a predefined time period by introducing a progressive transition through less dominant colors.

13. A non-transitory computer-readable medium of a server computer having stored thereon instructions that, when executed by one or more processors, cause the one or more processors to:
    determining, using a graphic processor, a first dominant color in a first data block of a background multimedia frame of digital multimedia content;
    determining, using at least one criteria, a first color that contrasts the first dominant color, the at least one criteria including selecting a contrasting color for at least one graphical item of a user interface based on a genre of the digital multimedia content;
    applying, by a user interface generator, the first color to a first graphical item of the user interface, the first graphical item being displayed in relation to at least a first portion of the background multimedia frame corresponding to the first data block;
    determining, using the graphic processor, a second dominant color in a second data block of the background multimedia frame of the digital multimedia content, the second dominant color being different than the first dominant color, and the first data block and the second data block corresponding to different portions of the background multimedia frame;
    determining, using the at least one criteria, a second color that contrasts the second dominant color; and
    applying, by the user interface generator, the second color to a second graphical item of the user interface, the second graphical item being displayed in relation to at least a second portion of the background multimedia frame corresponding to the second data block, at least the second portion being different than at least the first portion, and the first and second colors being selected to enable the first graphical item and the second graphical item to be visible in the user interface when displayed in relation to the background multimedia frame.

14. The non-transitory computer-readable medium according to claim 13, further comprising instructions that, when executed by one or more processors, cause the one or more processors to:
    assemble, by the graphic processor, a set of graphical items to form the user interface, the first and second colors being selected to be visible in parts of the digital multimedia content covered by the set of graphical items.

15. The non-transitory computer-readable medium according to claim 13, further comprising instructions that, when executed by one or more processors, cause the one or more processors to:
    analyze, by the graphic processor the digital multimedia content provided by a video transport stream comprising I-frame data blocks; and
    extract, from the I-frame data blocks, information associated with the first and second dominant colors in the background multimedia frame.

16. The non-transitory computer-readable medium according to claim 13, wherein the digital multimedia content is provided by a camera implemented in smart glasses or a windscreen, and wherein information associated with the first and second dominant colors is extracted from color composition.

17. The non-transitory computer-readable medium according to claim 13, further comprising instructions that, when executed by one or more processors, cause the one or more processors to:
    determine the first color according to user preferences introduced in an interactive manner when graphical items of the user interface are displayed based on pre-stored settings.

18. The non-transitory computer-readable medium according to claim 13, further comprising instructions that, when executed by one or more processors, cause the one or more processors to:
    determine the first color according to a quality of the digital multimedia content represented by the background multimedia frame.

* * * * *